United States Patent [19]

Brown

[11] Patent Number: 4,839,629
[45] Date of Patent: Jun. 13, 1989

[54] PICKUP TRUCK TAILGATE PROTECTOR WITH THIRD TAIL LIGHT

[76] Inventor: James M. Brown, 5710 Oakview La. North, Plymouth, Minn. 55442

[21] Appl. No.: 226,831

[22] Filed: Aug. 1, 1988

[51] Int. Cl.⁴ ............................................. B60Q 1/26
[52] U.S. Cl. .................................... 340/468; 340/475; 340/479; 362/61; 362/80
[58] Field of Search ............. 340/93, 87, 84, 102, 340/89, 94, 66, 67, 73, 74; 307/9, 10 R, 10 LS; 296/41, 50, 51, 61, 52, 53, 56, 57 R; 248/503; 224/309–311; 362/61, 80–83

[56] References Cited

U.S. PATENT DOCUMENTS

| | | | |
|---|---|---|---|
| D. 290,453 | 6/1987 | Konen et al. | D12/181 |
| D. 290,454 | 6/1987 | Menking et al. | D12/181 |
| D. 290,455 | 6/1987 | Konen et al. | D12/181 |
| 2,975,401 | 3/1961 | Shupe | 340/102 |
| 3,474,411 | 10/1969 | Collins | 340/87 |
| 3,691,366 | 9/1972 | Spreuer | 340/87 |
| 4,389,067 | 6/1983 | Rubio | 296/50 |
| 4,656,563 | 4/1987 | Segoshi et al. | 340/87 |

*Primary Examiner*—Donnie L. Crosland
*Attorney, Agent, or Firm*—Steven E. Kahm

[57] ABSTRACT

This invention relates to a pickup truck tailgate protector having a third tail light. The tailgate protector is made out of a plastic material shaped to fit over the top and top rear portion of the tailgate. The tailgate protector is attached to the tailgate by rivets. The plastic protects the metal and paint on the top portion of the tailgate from damage. The plastic tailgate protector has a housing in it for a third tail light in the center of its length. The third tail light provides extra safety for the vehicle, as studies have shown that the third tail light reduces traffic accidents.

5 Claims, 2 Drawing Sheets

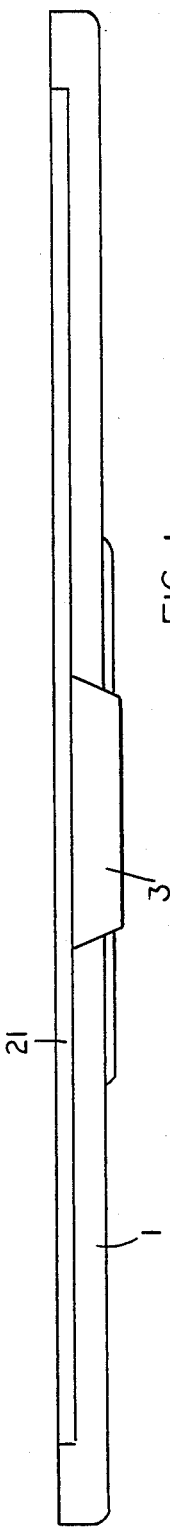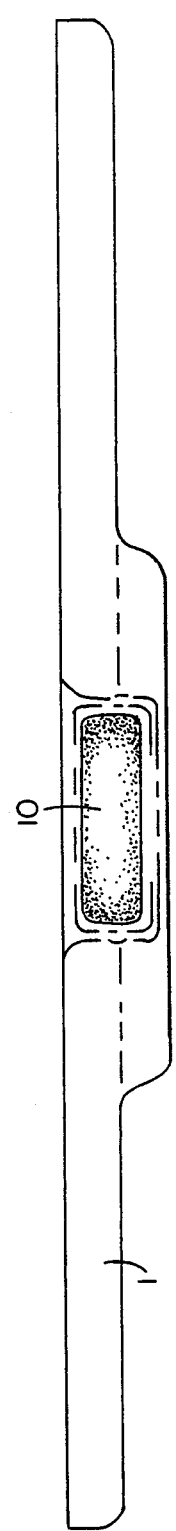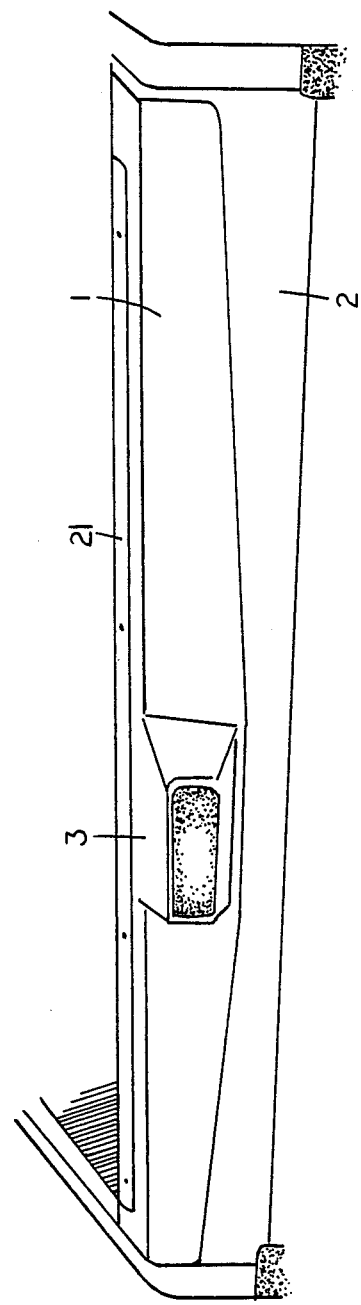

PICKUP TRUCK TAILGATE PROTECTOR WITH THIRD TAIL LIGHT

BACKGROUND OF THE INVENTION

Many owners of pickup trucks slide cargo in over the tailgate without opening the tailgate thus scuffing up and otherwise damaging the top of the tailgate. Also some cargo such as ladders and pipes frequently rest on top of and extend over the end of the tailgate also damaging the tailgates surface.

Further it has been found by a recent government study that a third tail light in the center of a vehicle at a higher level than the standard tail light reduces accidents. The government has therefore required the installation of such lights on new cars and will soon require the lights to be added to pickup trucks. However this leaves millions of vehicles on the road which could be retrofitted with such tail lights.

The present invention seeks to provide a third tail light and also protect the tailgate from damage caused by cargo. The invention can be easily added to older vehicles or installed at the factory on new ones.

SUMMARY OF THE INVENTION

The invention is a durable plastic tailgate protector, shaped to fit over the top and uppermost rear side of a pickup truck tailgate. The plastic is molded to have a recessed housing for a turn signal and tail light in the middle of its rear portion. For easily attaching the tailgate protector to the tailgate a series of holes are drilled in the top of the tailgate and a series of self locking rivets are used to secure the tailgate protector to the tailgate.

BRIEF DESCRIPTION OF THE DRAWINGS

FIG. 1 is a top view of the tailgate protector.
FIG. 2 is a front view of the tailgate protector.
FIG. 3 shows perspective view of the tailgate protector attached to a pick up truck.

DETAILED DESCRIPTION

Figure 4:
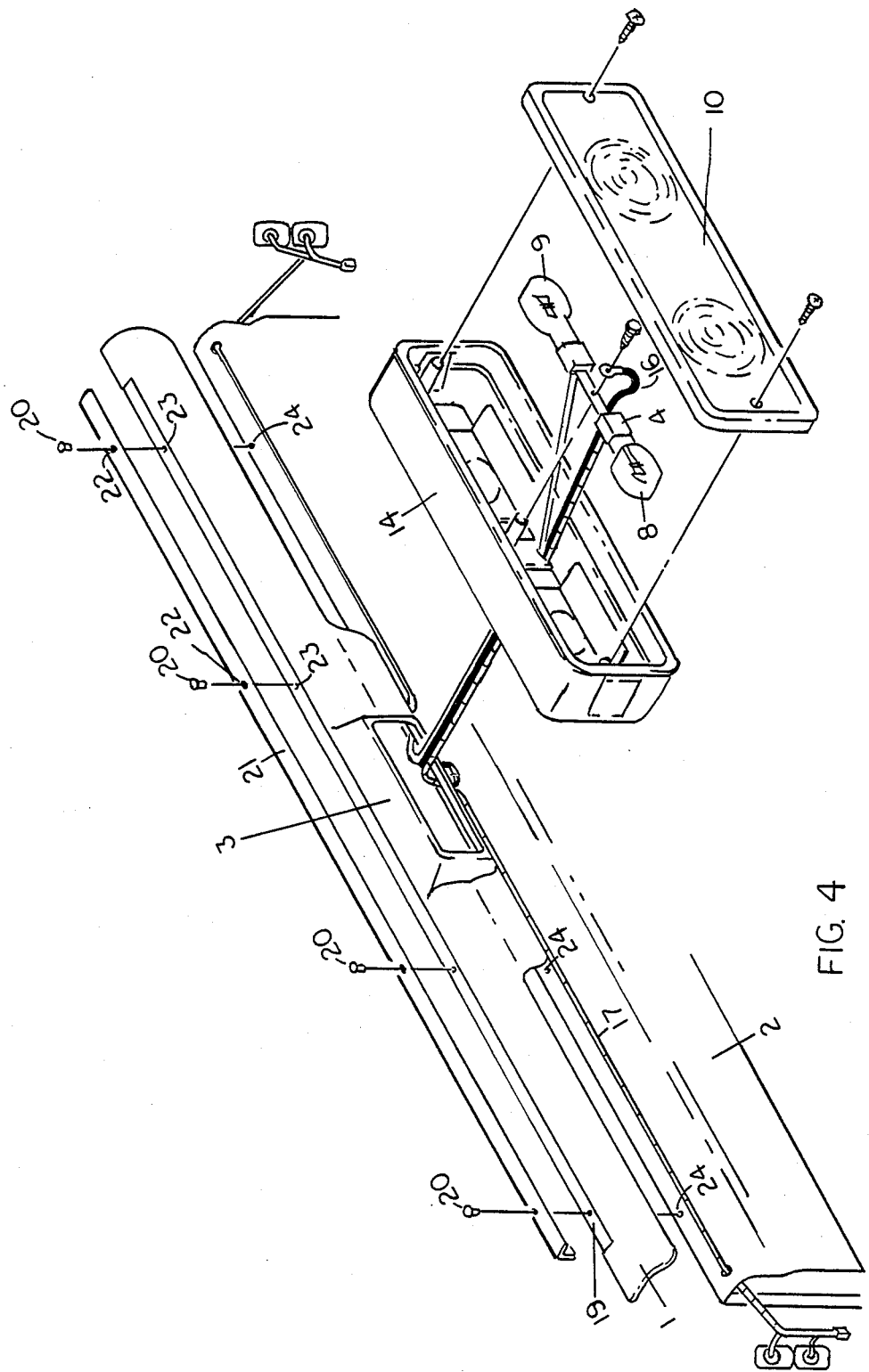
FIG. 4 is an exploded perspective view of the tailgate protector.

The invention consists of a molded plastic tailgate protector portion 1, which is shaped to cover the top and rear of a tailgate 2, on a pickup truck. The plastic is curved to fit the shape of the tailgate. Different shapes are made for different model pickup trucks.

The tailgate protector portion 1, has a light housing section 3, for housing a third tail light assembly 4 which is secured in a box 14. The light housing section 3, is preferably in the center of the tailgate protector's width.

The tail light assembly has in its preferred embodiment a right turn signal light 8, and a left turn signal light 9. Both lights 8, and 9, may be turned on simultaneously to signal braking.

The tail light assembly 4, may be wired so that it only operates as a brake light. In another possible embodiment only one bulb is used solely for a brake light.

The tail light assembly 4, is attached to a support in a box 14, which is inserted into the light housing section 3, of the tailgate protector portion 1, and attached thereto. A red lens cover 15, is attached to the box 14, covering the tail light assembly 4. The box 14 preferably has a hole in the back to permit wires to pass through.

A ground wire 16, is attached to the tail light assembly 4, and to the tailgate 2, of the pickup truck. The ground wire is preferably attached to the tailgate 2, under the tailgate protector portion 1, so as to protect the wire.

The other light wires 17, are attached to the tail light assembly and run through the back of the box 14, under the tailgate protector portion 1, to the edge of the tailgate 2, where a connection is made to the vehicles existing tail light wiring.

The tailgate protector portion 1, is attached to the top of the tailgate by self locking rivets 20. To retrofit a vehicle the owner must drill holes in the top of the tailgate. If the vehicle tailgate is manufactured with the addition of the tailgate protector in mind the holes will be provided by the factory. The rivets are inserted through a metal strip 21 having holes 22, in it. The metal strip covers part of the plastic tailgate protector portion 1, to help protect it and to provide a solid surface for the rivets to engage. The tailgate protector portion 1, is indented along an indented portion 19, on the top of the tailgate protector portion 1, to receive the metal strip while leaving a substantially flat surface when the strip is inserted and has holes 23, corresponding to the holes 22, in the metal strip 21. The self locking rivets 20, are inserted and hit with a hammer which then locks the rivets to the tailgate and firmly attaches the tailgate protector to the tailgate.

What is claimed is:

1. A tailgate protector for pickup trucks having a third tail light for increased traffic safety comprising,
   a plastic tailgate protecting portion having a top, a rear and a width,
   a light housing section in the middle of the tailgate protecting portion's width which has an inside and an outside,
   a tail light assembly having a right side and a left side,
   a pair of lights on the tail light assembly, one light on the right of the tail light assembly and one light on the left side of the tail light assembly.
   a box in which to insert the tail light assembly,
   a lens cover to cover the lights in the box,
   inserting the box with the tail light assembly inside the light housing section,
   a means of securing the tail light assembly inside the box,
   a means of securing the lens cover over the lights,
   a means of wiring the lights in the light housing section with wires so that both lights on the tail light assembly are when the brake lights of the vehicle are on, so that the left light is on when the left turn signal of the vehicle is on and so that the right light is on when the left turn signal of the vehicle is on,
   a means of attaching the tailgate protector to a tailgate on a pickup truck.

2. A tailgate protector for pickup trucks having a third tail light for increased traffic safety as in claim 1 where the box has a front and rear and there is a pair of reflectors in the rear of the box one behind each of the lights on the tail light assembly,
   the box has a hole on its rear side for wires to pass through.

3. A tailgate protector for pickup trucks having a third tail light for increased traffic safety as in claim 2 where the wires connected to the tail light assembly pass through the holes in the rear of the box and pass under the tailgate protector portion so as to be protected from damage.

4. A tailgate protector for pickup trucks having a third tail light for increased traffic safety as in claim 3 where there is an indented portion on the tailgate protector portion on the top thereof to receive a metal strip which will be flush with the top of the tailgate protector portion.

5. A tailgate protector for pickup trucks having a third tail light for increased traffic safety as in claim 4 where the means of attaching the tailgate protector to the tailgate of a pickup truck is by using a plurality of self locking rivets which pass through holes in the metal strip and corresponding holes in the tail gate protector and the top of the tailgate on a pickup truck.

* * * * *